Dec. 2, 1952     C. B. DOTY     2,620,223
FOLDABLE TOP FOR VEHICLE BODIES
Filed Sept. 17, 1949     6 Sheets-Sheet 1
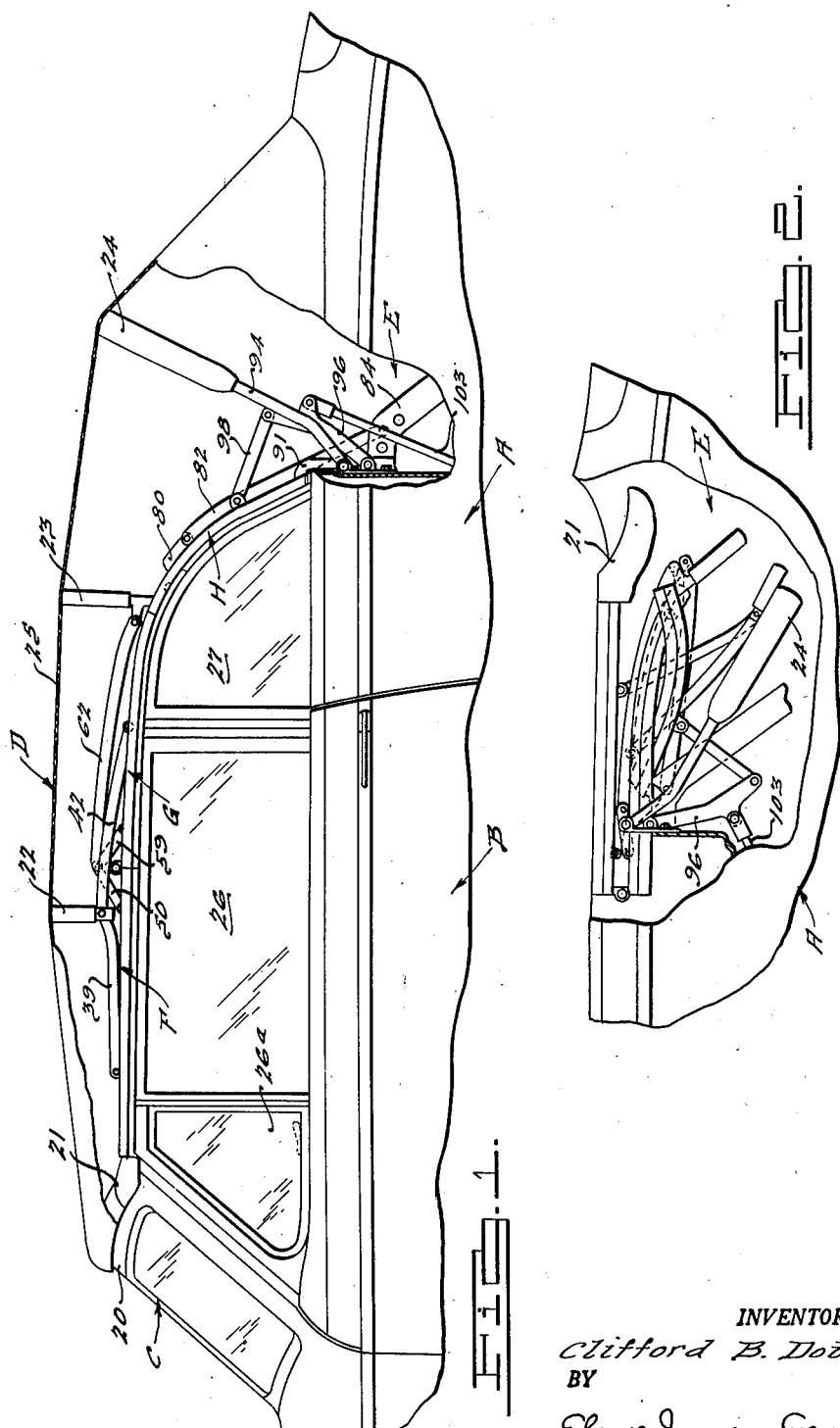
INVENTOR.
Clifford B. Doty.
BY
Elmer Jameson Gray
ATTORNEY.

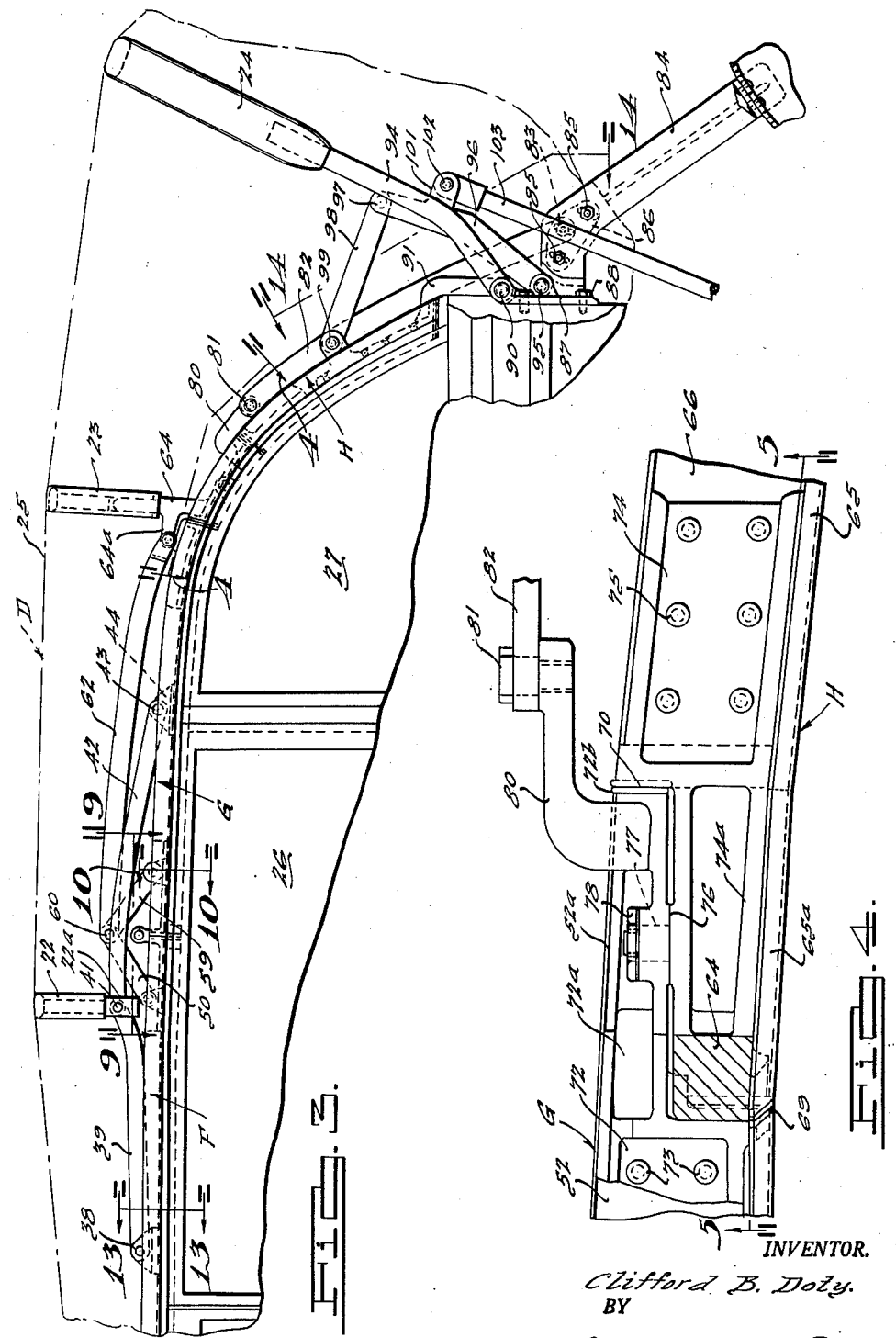

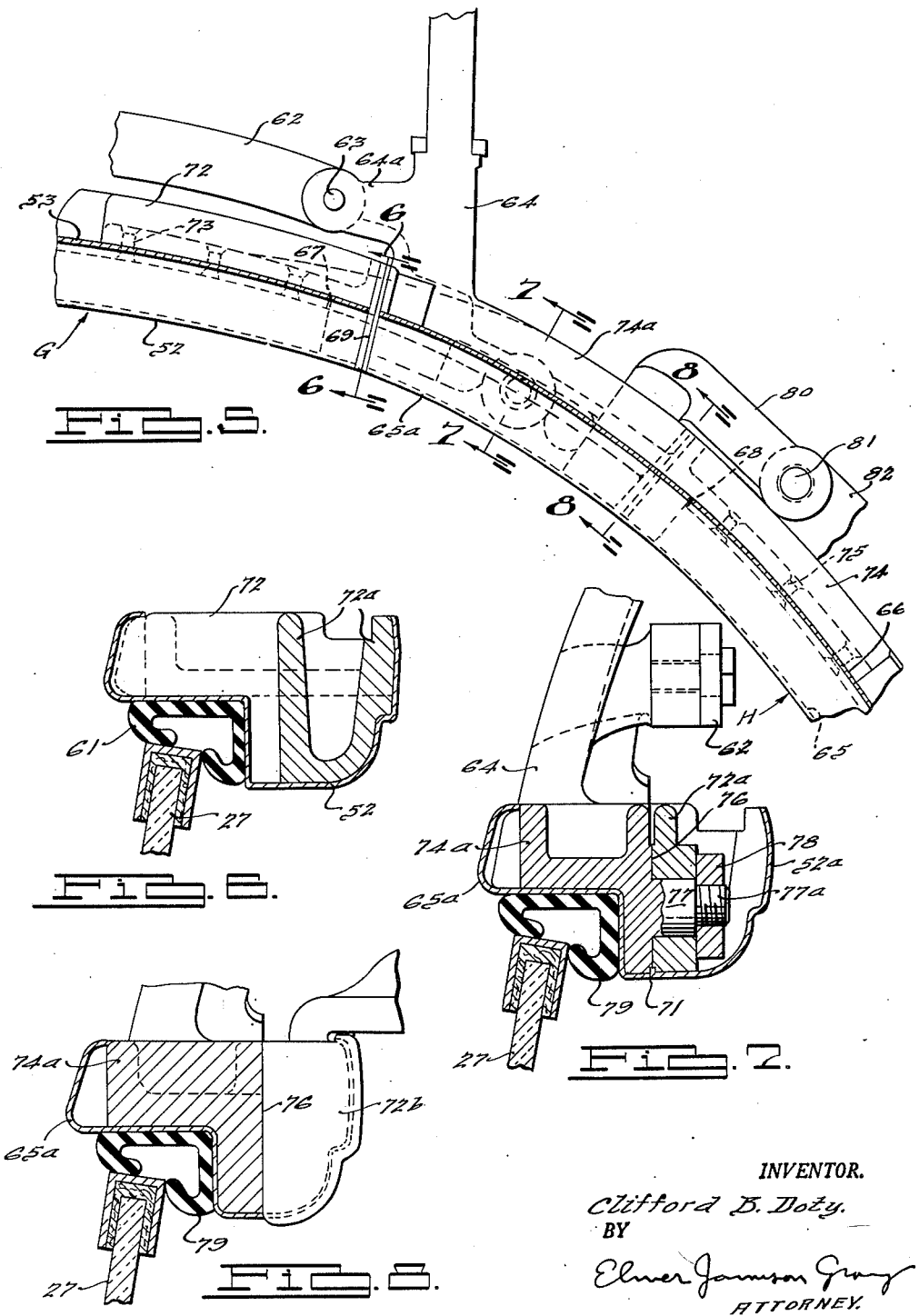

Dec. 2, 1952
C. B. DOTY
2,620,223
FOLDABLE TOP FOR VEHICLE BODIES
Filed Sept. 17, 1949
6 Sheets-Sheet 4
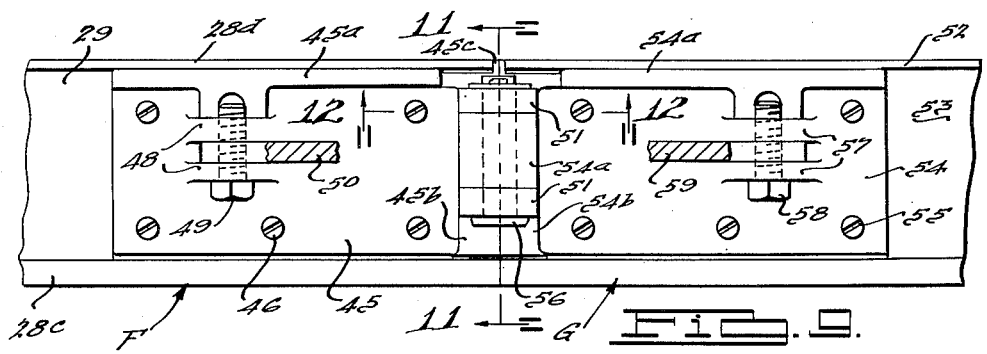
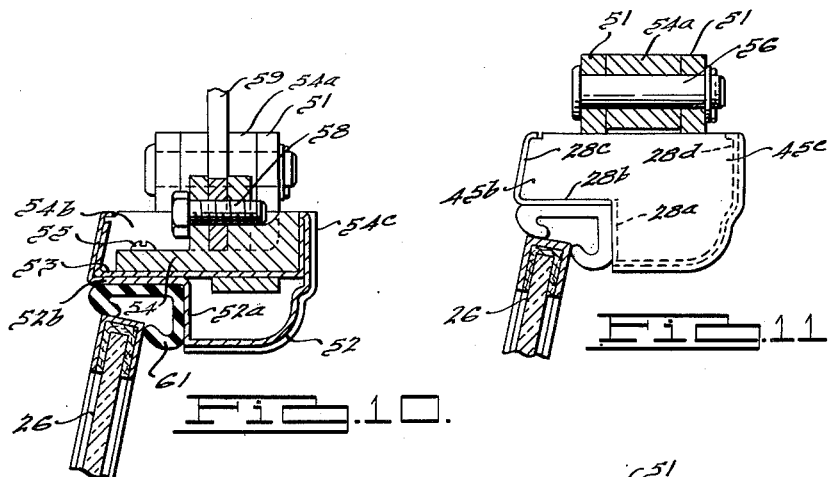
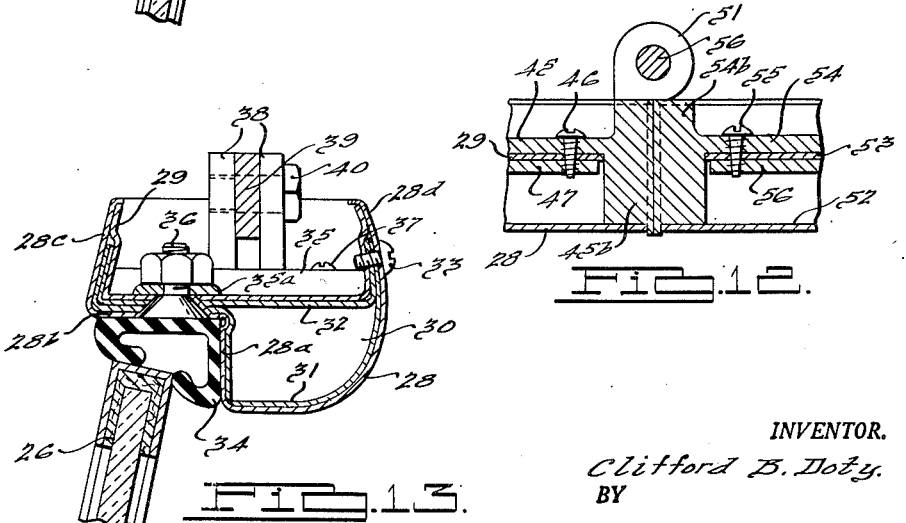
INVENTOR.
Clifford B. Doty.
BY
Elmer Jamison Gray
ATTORNEY.

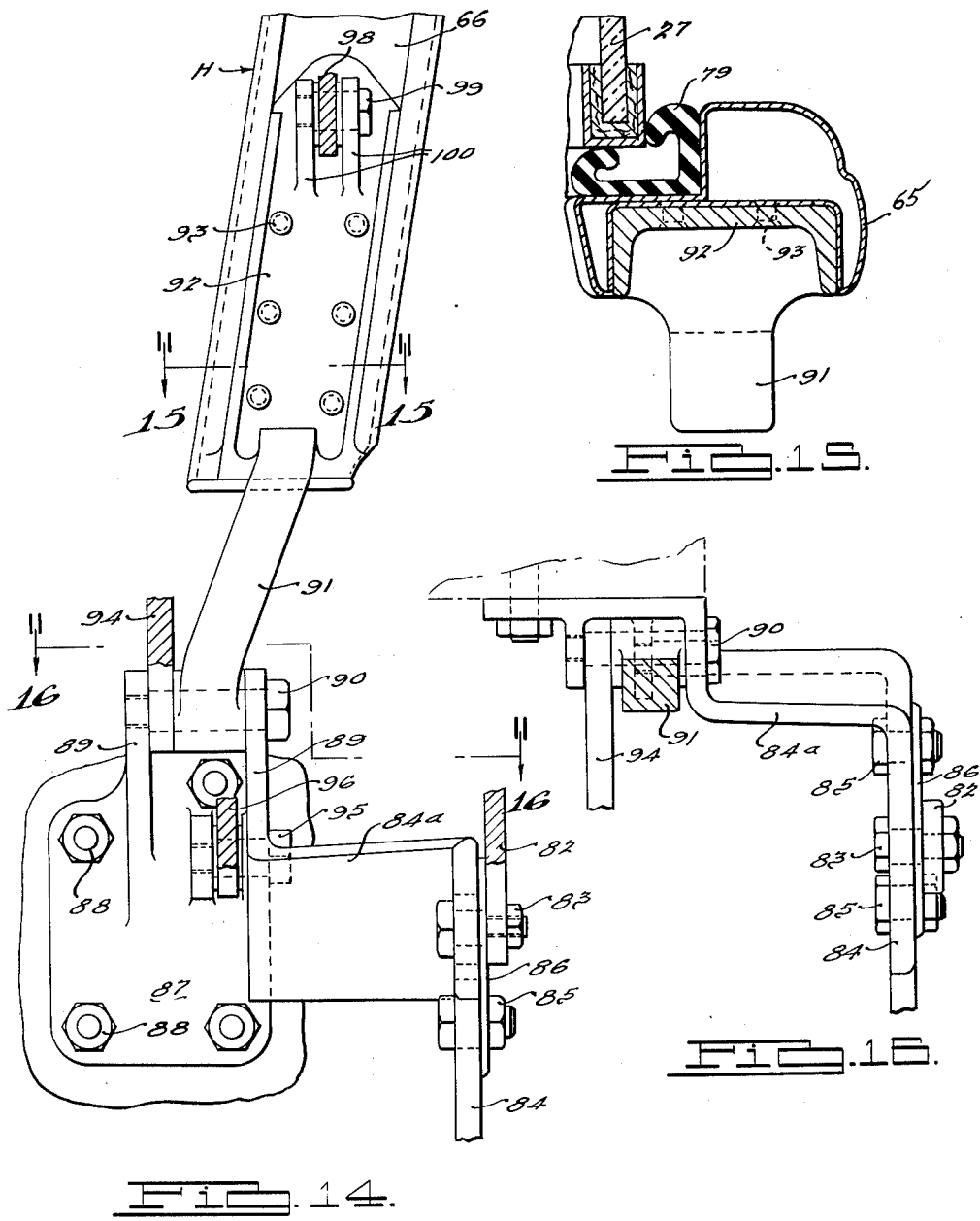

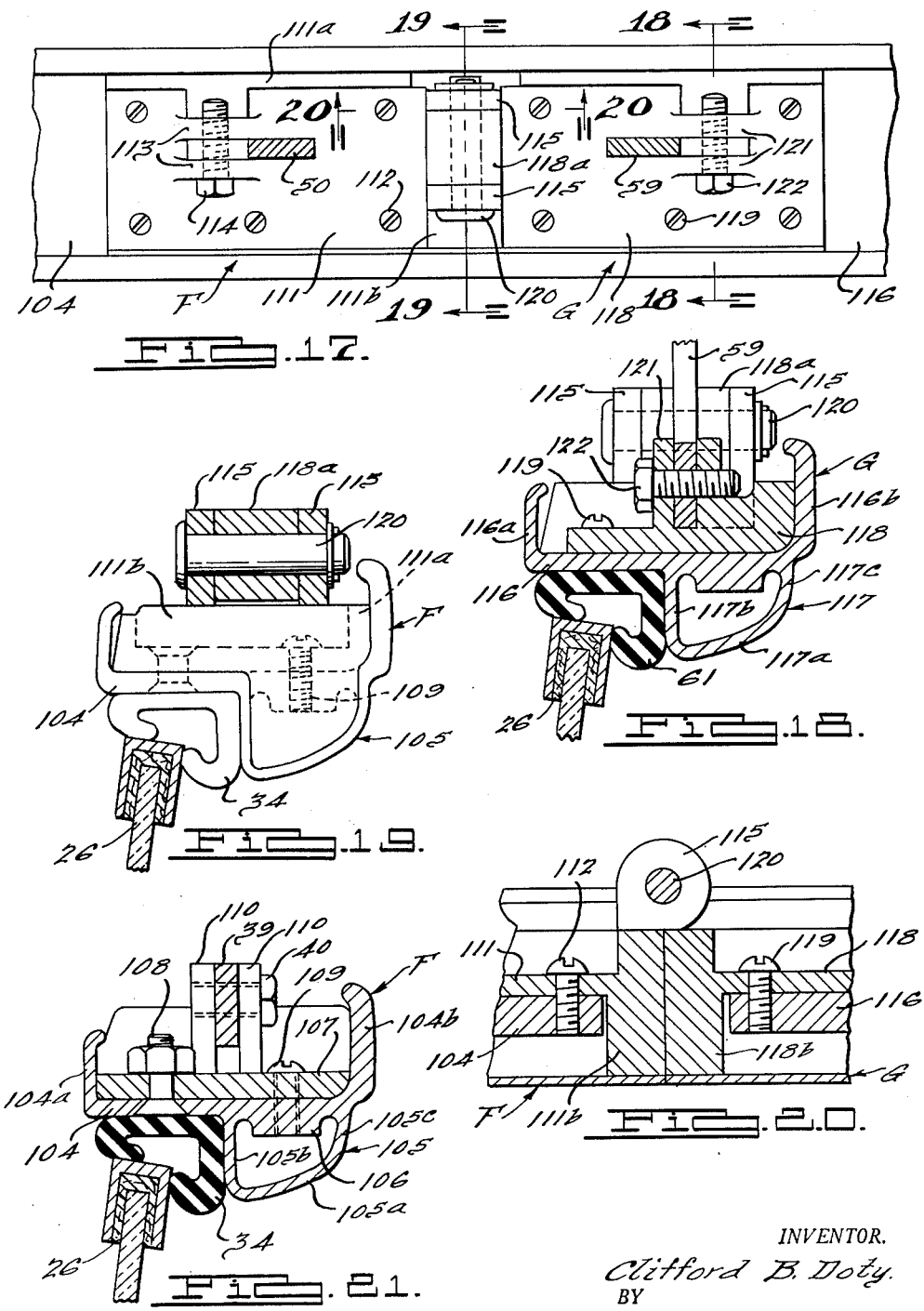

Patented Dec. 2, 1952

2,620,223

UNITED STATES PATENT OFFICE 2,620,223

FOLDABLE TOP FOR VEHICLE BODIES

Clifford B. Doty, Detroit, Mich., assignor to Briggs Manufacturing Co., Detroit, Mich., a corporation of Michigan Application September 17, 1949, Serial No. 116,339

32 Claims. (Cl. 296—116)

This invention relates to vehicle bodies and more particularly to automobile bodies of the so-called convertible type having foldable or collapsible tops.

An object of the invention is to improve the construction of the foldable or collapsible tops of automobile bodies or the like so as to provide a more compact unit when collapsed or folded into the body while at the same time increasing the strength of the top when in open position, reducing to a minimum the cross-sectional size of many of the component parts of the top and improving the appearance of the top when in operative position.

Another object of the invention is to provide a collapsible or foldable top for a vehicle body in which the side rails, to which the edges of the fabric top are secured, are in the form of upwardly opening channels carrying concealed bracket members or mounting blocks to which various operating links are pivoted, these channels being reinforced by box-like sections in such manner as to provide neat and solid appearing rails preferably constructed in improved manner to receive and seal the upper edges of the window panels.

Another object of the invention is to provide a foldable top in which certain of the side rails are in the form of upwardly opening channels reinforced by underlying channel-like sections integral therewith and closed along the top thereof by the bottom webs of the upper channels, thereby providing a combined channel and box-like cross-sectional structure of improved character.

A further object of the invention is to provide an improved foldable top for a vehicle body in which each side rail, to which an edge of the fabric top is secured, is composed of abutting sections pivoted together, each rail section comprising interfitting channels so arranged as to provide a bottom box-like portion and a top upwardly opening channel portion of greater width than the box-like portion, thus providing a rabbeted or recessed edge to receive a sealing strip for the window panel.

A further object of the invention is to form the side rails as extruded metal sections, such as aluminum sections, in which the upwardly opening channel of each rail is integrally united to an underlying hollow or channel-like section closed at its bottom and narrower than the upper channel so as to provide therewith a longitudinal recess for the reception of the upper edge of a window panel.

Still a further object of the invention is to provide a side rail structure for the foldable top in which cast blocks or bracket members are mounted and housed within the rail channels adjacent the ends of the abutting rail sections, these blocks or bracket members providing mountings for the operating links and fabric supporting bows and also closing the ends of the channels to provide flat abutting ends for the adjacent rail sections. In addition to the foregoing, the mounting blocks or brackets within the ends of the rail channels enable most of the operating links to be neatly arranged immediately above and in the vertical plane of the rail sections thereby largely eliminating the necessity, as heretofore, of having the top operating link mechanism protrude into the passenger space within the body and thereby present not only an unsightly appearance but also a hazard to the passengers when the top is folded back or collapsed.

Other objects of this invention will appear in the following description and appended claims, reference being had to the accompanying drawings forming a part of this specification wherein like reference characters designate corresponding parts in the several views.

Fig. 1 is a fragmentary side elevation, partly broken away, illustrating a collapsible or foldable top for a vehicle body constructed in accordance with the present invention.

Fig. 2 is a fragmentary side elevation illustrating the top in collapsed or folded position within a compartment at the rear of the body.

Fig. 3 is an enlarged fragmentary side elevation illustrating the operating mechanism of the top when the latter is in open position.

Fig. 4 is an enlarged fragmentary plan view, partly in section, taken from lines 4—4 of Fig. 3 looking in the direction of the arrows.

Fig. 5 is an enlarged fragmentary sectional view taken substantially through lines 5—5 of Fig. 4 looking in the direction of the arrows.

Fig. 6 is an enlarged section taken substantially through lines 6—6 of Fig. 5 looking in the direction of the arrows.

Fig. 7 is an enlarged section taken substantially through lines 7—7 of Fig. 5 looking in the direction of the arrows.

Fig. 8 is an enlarged section taken substantially through lines 8—8 of Fig. 5 looking in the direction of the arrows.

Fig. 9 is an enlarged horizontal section taken substantially through lines 9—9 of Fig. 3 looking in the direction of the arrows.

Fig. 10 is an enlarged vertical section taken substantially through lines 10—10 of Fig. 3 looking in the direction of the arrows.

Fig. 11 is a section taken substantially through lines 11—11 of Fig. 9 looking in the direction of the arrows.

Fig. 12 is a section taken substantially through lines 12—12 of Fig. 9 looking in the direction of the arrows.

Fig. 13 is an enlarged section taken substantially through lines 13—13 of Fig. 3 looking in the direction of the arrows, this section also being enlarged as compared with the section shown in Fig. 10.

Fig. 14 is a sectional view taken substantially through lines 14—14 of Fig. 3 looking in the direction of the arrows.

Fig. 15 is an enlarged section taken substantially through lines 15—15 of Fig. 14 looking in the direction of the arrows.

Fig. 16 is a section taken substantially through lines 16—16 of Fig. 14 looking in the direction of the arrows.

Fig. 17 is a view generally similar to Fig. 9 illustrating another embodiment of the invention.

Fig. 18 is a section taken substantially through lines 18—18 of Fig. 17 looking in the direction of the arrows.

Fig. 19 is a section taken substantially through lines 19—19 of Fig. 17 looking in the direction of the arrows.

Fig. 20 is a section taken substantially through lines 20—20 of Fig. 17 looking in the direction of the arrows.

Fig. 21 is a view generally similar to Fig. 13 but illustrating another embodiment of the invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

This application is a continuation in part of my applications Ser. No. 714,779, filed December 7, 1946, now abandoned, and Ser. No. 14,230, filed March 11, 1948, now forfeited.

In the drawings there is illustrated, by way of example, a collapsible or foldable top constructed in accordance with certain embodiments of the present invention as applied to a convertible body A of the two door type. It will be understood, however, that the invention may be utilized in connection with other types of vehicle or automobile bodies, such as convertible bodies of the four door type. The body A is provided with a swinging door B at each side thereof, a windshield C and a collapsible or foldable top D adapted to be folded into a compartment E, as shown in Fig. 2, located between the rear seat of the body and the rear deck compartment.

The windshield C terminates at its upper edge in a transverse header 20 and the collapsible top D terminates at its forward edge in a transverse hollow header 21 adapted to engage locating pins or studs on the windshield header and to be clamped thereto by operating mechanism located principally within the header 21 and actuated by means of a handle accessible to the front seat passenger at a point above the windshield. The manner in which the header 21 of the foldable top is located on the windshield header 20, when the top is opened, and is drawn down and clamped thereto may take any suitable form but is preferably in accordance with Patent No. 2,411,945, issued December 3, 1946.

The collapsible or foldable top D also comprises a front bow 22, an intermediate or middle bow 23, and a rear bow 24 over which the fabric 25 of the top is stretched. The opposite side edges of the fabric are attached to the foldable side rails of the top, hereinafter described. The front edge of the fabric 25 is secured to the header 21 and the rear edge of the fabric is attached to the body around the upper edge of the compartment E. Slidably mounted within the door B in the usual manner is a glass panel 26. The door is also provided with the usual pivoted wing 26a, and in rear of the door there is provided a glass quarter panel 27 which is preferably mounted so as to swing downwardly into a well within the body when the top is collapsed. Since the construction of the foldable top with reference to the side rails and operating linkage for the bows 22, 23 and 24 is the same at each side of the body, it will suffice to illustrate and describe the construction at only one side of the body.

The foldable top is provided at each side of the body with a sectional side rail extending from the header 21 to the rear of the body at a point adjacent the front upper edge of the compartment E, this sectional side rail comprising a front rail section F, a middle rail section G pivoted thereto, and a rear rail section H pivotally connected to the rail section G.

Referring to Fig. 13, the front rail section F comprises two interfitting channel members 28 and 29. The outer rail section 28 is rabbeted or recessed along its outer lower side to provide a vertical longitudinal wall 28a terminating in a horizontal wall 28b. The inner channel member 29 is relatively shallow so as to fit between the upper portions of the side walls 28c and 28d of the channel 28 with the bottom of the channel 29 extending transversely above and along the wall 28b thereof. The interfitting channels 28 and 29 are spot welded together and thus form a longitudinal box section 30. Near the forward end of the rail section F the bottom and side rails of the channel 29 are offset inwardly, as shown in Fig. 13, to provide sufficient space or clearance to receive the correspondingly shaped channel extensions 31 and 32 of the header 21. The channel extensions 31 and 32 of the header are spot welded together and are thus assembled with the rail section F by telescoping them into the open end of the latter, the parts assuming the relative positions shown in Fig. 13 and being secured together by set screws 33.

The rabbeted portion of the channel member 28 of the rail section F, formed by the angularly related walls 28a and 28b, provides a recess extending the full length of the rail section within which is mounted a flexible or resilient weatherstrip 34 engageable by the upper edge of the window panel 26 when in raised or closed position.

Mounted within the forward portion of the channel member 29, see Figs. 3 and 13, is a cast insert piece or bracket member 35 formed with attaching wings 35a by means of which the member 35 is bolted at 36 to the telescoped rail sections at the locality of the wall 28b. The bracket member 35 may also be rigidly secured in position by means of screws 37.

Extending integrally from the base of the bracket member 35 are spaced ears 38 receiving the forward end of a link 39 which is pivoted thereto by means of a bolt 40. The rear end of the link 39 is pivoted at 41 to a leg 22a projecting from the lower end of the front bow 22. The front end of a link 42 is also pivoted at 41 to the depending leg 22a of the bow 22 and the rear end of the link 42 is pivoted at 43 to upstanding ears integral with a cast insert or bracket member 44 mounted within the rail section G in the same manner as is shown in Fig. 13. The construction of the bracket member 44 to which the link 42 is pivoted corresponds substantially to the construction of the bracket 35.

Referring to Figs. 9 to 12 inclusive, there is mounted at the rear end of the rail section F and within the upper inner channel 29 thereof a cast insert or bracket member 45 which comprises a main relatively thin flat portion resting upon the base of the channel 29 and fitting between the side walls thereof. The bracket insert 45 terminates at its inner edge in an upstanding flange 45a and at its rear end in a vertical boss 45b located beyond the terminal end of the inner channel 29 and shaped to fit within the outer channel 28. The bracket insert 45 is rigidly secured by means of screws 46 to the base of the channel 29 and also to a reinforcing piece 47 underlying the latter. As illustrated in Fig. 9, the bracket insert 45 is provided with upstanding ears 48 to which is pivoted at 49 the lower end of a short upwardly extending link 50. As illustrated in Fig. 11, the terminal boss 45b of the bracket member 45 fits snugly within the terminal end of the channel 28, providing a flat transverse end closure for the channel having a projecting lip 45c overlapping the terminal edges of the walls 28a and 28d. Extending upwardly from the end boss 45b are spaced ears 51 by means of which the rail section G is pivoted to the rail section F as later described.

The rail section G is constructed similarly to the rail section F and, as shown in Fig. 9, is arranged end to end and in abutting relation to the rail section F when the top is in open position. Thus, the rail section G comprises an outer channel member 52 which is rabbeted or recessed along its outer lower side to provide a vertical longitudinal wall 52a terminating in a horizontal wall 52b, this construction corresponding to the construction of the channel member 28. Within the channel 52 is mounted an inner channel member 53 which engages the wall 52b and is spot welded to the outer channel member. Housed within the inner channel member 53 of the rail section G is a cast insert or bracket member 54 which is secured in position by means of screws 55. The bracket member 54 at its forward end is provided with an upstanding integral ear 54a which is positioned between the ears 51 on the bracket member 45, these parts being pivotally connected together by means of a bolt 56. The bracket 54, as in the case of bracket 45, is cast to provide end cap portions 54b and 54c, corresponding to portions 45b and 45c, which close the end of channel 52. Thus, the rail sections F and G have solid ends with flat abutting surfaces.

Near its rear end the insert bracket member 54 is formed integrally with upstanding ears 57 to which is pivoted at 58 the lower end of a short upwardly extending link 59. This link is pivoted at its upper end at 60, see Fig. 3, to the upper end of the link 50. As shown in Fig. 10, the recess or rabbeted portion of the channel member 52, formed by the angularly related walls 52a and 52b thereof, receives a suitable flexible sealing strip 61, preferably formed of rubber, which is engaged by the upper edge of the window panel 26 when the latter is shifted into closed position. Also pivoted at 60 to the pivotally connected ends of the links 50 and 59 is the forward end of a relatively long link 62. The rear end of the link 62, as shown in Figs. 3 and 5, is pivoted at 63 to a crank arm 64a on a leg member 64 projecting from the end and forming a part of the middle bow 23.

Referring particularly to Figs. 3 to 8 inclusive, the rear rail section H is formed similarly to the rail section G, comprising an outer main channel member 65 similar to the channel 52 and an inner channel member 66 spot welded thereto and arranged similarly to the inner channel member 53. The outer channel member 65 of the rail section H is also rabbeted or recessed to receive a sealing strip 79 engageable by the window panel 27 when the latter is shifted into closed position.

Referring to Figs. 4 and 5, it will be noted that the inner channel member 53 of the rail section G terminates at a point 67 while the inner channel member 66 of the rail section H terminates at a point 68. The outer channel member 52 of the rail section G is cut away longitudinally to provide an extension 52a. Similarly the outer channel member 65 of the rail section H is cut away longitudinally to provide an extension 65a. These mating extensions 52a and 65a, see Figs. 4 and 7, form together a longitudinally split portion of the side rail of the top which, when the top is open, has substantially the same cross-sectional size and contour as the adjacent portions of the rails G and H. The extension 65a terminates at its forward end at point 69 lying on section 6—6, and the extension 52a terminates at its rear end at point 70 on section line 8—8. Hence, it will be seen that when the top is folded back the rail sections G and H break at points 69 and 70. These sections, when they line in overlapping relation, as shown in Figs. 4 and 7, abut together along a longitudinal line 71.

Mounted within the rail section G and engaging the bottom of the inner channel 53 thereof is a cast insert or bracket member 72 secured in position by means of rivets 73. This bracket member 72 is provided with an extension 72a which is housed within the channel extension 52a, terminating in an integral end cap 72b (Fig. 8) which overlaps and closes the rear end of the extension 52a. Mounted within the inner channel 66 of the rail section H is a cast insert or bracket member 74 secured in position by rivets 75. This bracket member is generally similar to the bracket member 72 and in like manner is provided with an extension 74a which is housed within the extension 65a of the outer channel member 65 of rail section H. The extension 74a provides a solid closure for the end of channel extension 65a and terminates in a flat face lying in abutting relation to a similar flat face on the end of the cast insert.

Thus, as particularly shown in Figs. 4 and 7, the bracket extensions 72a and 74a overlap each other throughout the length thereof and abut together along a longitudinal line 76. These bracket extensions are pivoted together through the medium of a cylindrical boss 77 on the bracket extensions 74a journalled within a hole in the bracket extensions 72a. The boss or pivot 77 has a reduced threaded end 77a upon which is threaded a nut 78 for connecting the parts together.

From the foregoing it will be seen that the rail sections G and H are pivoted together at 77 through the medium of the bracket extensions 72a and 74a thereof. The lower end of the leg extension 64 of the middle bow 23 is cast as an integral portion of the forward end of the bracket extension 74a, the terminal portion of the latter forming a solid plug closing the end of the channel extension 65a at point 69.

The rear end of the bracket extension 72a is provided with an integral inwardly extending crank arm 80 to which is pivoted at 81 the forward end of a relatively long link 82. The rear end of this link is adjustably pivoted at 83 to a bracket 84, see Figs. 3, 14 and 15. The adjustment of the pivot 83 to the bracket 84 is accomplished through the medium of a plate 86 which is adjustably bolted at 85 to the bracket 84. This bracket has an outwardly extending flange 84a extending integrally from a bracket base 87 bolted at 88 to the body. The bracket base 87 is provided with integral spaced ears 89 to which is pivoted at 90 an arm 41 formed as an integral extension of a cast insert or bracket member 92 mounted within the rear end of the rail section H. This bracket insert 92 is housed within the rail section and is secured in position as by means of rivets 93.

The rear bow 24 terminates at its end in a leg member 94 which is pivoted at 90 to the ears 89 on the bracket 87, see Fig. 14. Thus, the rail section H through the arm 91 swings about the same pivotal axis as the rear bow 24. Also pivoted at 95 to the bracket base 87 is the lower end of an operating link 96, the upper end of this link being pivoted at 97 to a forwardly extending link 98 pivoted at 99 to a pair of ears 100 formed integrally on the bracket insert 92. The link 96 has a crank extension 101 to which is pivotally connected at 102 the reciprocable ram or piston rod 103 of a hydraulic cylinder mechanism (not shown) adapted to be actuated by the driver of the vehicle, such as through the medium of a push button on the instrument panel, to open or close the top.

Referring to the embodiment illustrated in Figs. 17 to 21 inclusive and in particular to Fig. 21, the front rail section F comprises a unitary metal member, preferably extruded, which is formed in one piece as a combined channel and box-like structure. In forming the rail the metal is extruded to produce a top upwardly opening channel having a bottom horizontal web 104 terminating in an outer upright flange 104a which preferably has its upper edge turned inwardly as shown in Fig. 21. The bottom web 104 also terminates at its inner edge in an upright flange 104b of somewhat greater thickness and height than the flange 104a and also having its upper edge turned inwardly. In forming the rail the metal is also extruded to produce an underlying channel-like section 105 which has a bottom web 105a terminating in an upright outer flange 105b which merges integrally into the bottom web 104. The web or bottom 105a of the section 105 preferably slopes upwardly and inwardly into an inner flange 105c which merges integrally into the bottom 104 of the upper channel section. Thus, the underlying hollow section 105 forms with the bottom 104 of the upper channel a closed box-like structure. During the process of extruding the metal to form the rail F the bottom 104 is preferably formed with a continuous longitudinally extending rib 106 which projects into the interior of the underlying section 105, as shown in Fig. 21. It will be noted that the hollow underlying section 105 of the rail is narrower than the upper channel section, thus providing a longitudinal rabbeted portion formed by the angularly related walls 104 and 105b. By virtue of this construction there is provided a recess similar to the recess in the previous embodiment extending the full length of the rail F within which is mounted the flexible or resilient weatherstrip 34 engageable by the upper edge of the window panel 26 when in raised or closed position.

Mounted within the upper channel member of the rail section F intermediate the ends thereof, see Fig. 21, is a cast insert piece or bracket member 107 which is bolted at 108 to the bottom web 104 of the channel section. This insert piece is also rigidly secured in position by means of screws 109 extending through tapped holes in the rib 106.

Extending integrally from the base of the bracket member or insert piece 107 are spaced ears 110 receiving the forward end of the link 39 which is pivoted thereto by means of the bolt 40. The rear end of this link is pivotally connected to the lower end of the front bow 22 as in the previous embodiment. The front end of the link 42 is pivotally mounted as in the previous embodiment and the rear end of this link is pivotally connected to a cast insert bracket mounted within the upwardly opening channel of the rail section G in the same manner as is shown in Fig. 21.

Referring to Figs. 17 to 20 inclusive, there is mounted at the rear end of the rail section F and within the upper channel portion thereof a cast insert or bracket member 111 which comprises a main relatively thin flat portion resting upon the base 104 of the channel and fitting between the side walls thereof. The bracket insert 111 terminates at its inner edge in an upstanding flange 111a and at its rear end in a vertical boss 111b located beyond the terminal end of the base 104. The bracket insert 111 is rigidly secured by means of screws 112 to the base 104 of the channel. As illustrated in Fig. 17, the bracket insert 111 is provided with upstanding ears 113 to which is pivoted at 114 the lower end of the link 50. Extending upwardly from the end boss 111b are spaced ears 115 by means of which the rail section G is pivoted to the rail section F as later described.

The rail section G is constructed similarly to the rail section F and, as shown in Fig. 17, is arranged in end to end relation with respect to the rail section F when the top is in open position. Thus, the rail section G, as shown in Fig. 18, comprises an upper channel member having a base or bottom web 116 terminating in upright outer and inner flanges 116a and 116b which are turned at their upper edges. The rail section G also comprises an underlying box-like section 117 which includes a base or bottom web 117a and outer and inner upwardly extending flange portions 117b and 117c which merge seamlessly with the base or web 116, a portion of which forms the fourth side of the box-like section. Since the box-like section 117 is narrower than the base or web 116, there is provided in the angle between the latter and the wall 117b a longitudinal recess for the reception of the flexible resilient weatherstrip 61 engageable by the upper edges of the window panels 26 and 27 when closed.

Housed within the upper channel portion of the rail section G is a cast insert or bracket member 118 which is secured in position by means of screws 119. The bracket member 118 at its forward end is provided with an upstanding integral end 118a which is positioned between the ears 115 on the bracket member 111, these parts being pivotally connected together by means of a bolt 120. The bracket member 118, as in the case of the bracket 111, is cast to provide an end boss 118b which has a flat face abutting against the corresponding flat face of the boss 111b.

Near its rear end the insert bracket 118 is formed integrally with upstanding ears 121 to which is pivoted at 122 the lower end of the link 59. As in the previous embodiment this link is pivoted at its upper end to the upper end of the link 50.

The rear rail section H in the embodiment of Figs. 17 to 21 inclusive may be formed similarly to the rail section G comprising an extruded metal member formed with an upwardly opening channel section and an integral underlying narrower box-like section forming a longitudinal recess or rabbet for the reception of the resilient or flexible weatherstrip, similar to the weatherstrip 34, engageable by the upper edge of the window panel 27 when the latter is shifted into closed position.

I claim:

1. A foldable top for a vehicle body including a side rail, a supporting bow and articulated members, said side rail comprising an outer channel having one side wall formed with a longitudinal recess to receive the upper edge of a window panel, an inner channel of less depth mounted within the outer channel and forming a box-like section at one side of said recess, and a bracket member mounted within said inner channel and to which one of said articulated members is pivoted.

2. A foldable top for a vehicle body including a side rail, a supporting bow and articulated members, said side rail comprising an outer channel having one side wall formed with a longitudinal recess to receive the upper edge of a window panel, an inner channel of less depth mounted within the outer channel and forming a box-like section at one side of said recess, and a bracket member mounted within said inner channel and to which said bow is secured.

3. A foldable top for a vehicle body including a side rail, a supporting bow and articulated members, said side rail comprising an outer channel having one side wall formed with a longitudinal recess to receive the upper edge of a window panel, a member mounted within said outer channel above said recess and connecting the side walls of the channel together to form therewith a longitudinal box-like portion and an upwardly opening channel portion, and means within said channel portion for connecting said bow to the rail.

4. A foldable top for a vehicle body including a side rail, a supporting bow and articulated members, said side rail comprising an outer channel having one side wall formed with a longitudinal recess to receive the upper edge of a window panel, a member mounted within said outer channel above said recess and connecting the side walls of the channel together to form therewith a longitudinal box-like portion and an upwardly opening channel portion, and means within said channel portion for pivotally connecting one of said articulated members to the rail.

5. A foldable top for a vehicle body including a pair of side rails arranged end to end, each rail comprising an upwardly opening channel portion and said channel portions having laterally overlapping extensions, bracket members arranged within said channel portions and having extensions disposed within said channel extensions, and means for pivoting said bracket member extensions together.

6. A foldable top for a vehicle body including a pair of rails arranged end to end, each rail comprising an upwardly opening channel portion and said channel portions having laterally overlapping extensions, bracket members arranged within said channel portions and having extensions disposed within said channel extensions, and means for pivoting said bracket member extensions together, said top also including a bow having its lower end connected to one of said bracket member extensions.

7. A foldable top for a vehicle body including a pair of rails arranged end to end, each rail comprising an upwardly opening channel portion and said channel portions having laterally overlapping extensions, bracket members arranged within said channel portions and having extensions disposed within said channel extensions, and means for pivoting said bracket member extensions together, said top also including a bow connected to one of said bracket member extensions and a link actuated arm secured to the other of said bracket member extensions.

8. A foldable top for a vehicle body including a pair of rails arranged end to end when the top is open, said rails at their adjacent ends being cut away longitudinally to provide narrower extensions disposed side by side in overlapping relation, and members secured within said extensions and pivoted together at a point located intermediate the terminal ends of said extensions.

9. A foldable top for a vehicle body including a pair of rails arranged end to end when the top is open, said rails comprising upwardly opening channels and said channels at their adjacent ends being cut away longitudinally to provide narrower extensions disposed side by side in overlapping relation, and members secured within said extensions and pivoted together at a point located intermediate the terminal ends of said extensions.

10. A foldable top for a vehicle body including a pair of rails adapted to be positioned end to end, each rail comprising interfitting inner and outer channels forming an upwardly opening channel portion, a box-like portion therebelow, and a recessed portion at one side of the box-like portion to receive an edge of a window panel; said outer channels at adjacent ends being longitudinally cut away to provide extensions arranged side by side in overlapping relation, and cast bracket members disposed within said extensions and pivoted together to permit said rails to be folded.

11. A foldable top for a vehicle body including a pair of rails adapted to be positioned end to end, each rail comprising interfitting inner and outer channels forming an upwardly opening channel portion, a box-like portion therebelow, and a recessed portion at one side of the box-like portion to receive an edge of a window panel;

said outer channels at adjacent ends being longitudinally cut away to provide extensions arranged side by side in overlapping relation, and cast bracket members disposed within said extensions and pivoted together to permit said rails to be folded, said bracket members having extended portions lying within said inner channels.

12. In a vehicle body, a foldable top comprising articulated members adapted to be folded together as a unit and including a side rail formed from superimposed upwardly opening channel portions, each comprising a bottom terminating in upwardly extending side flanges, the bottom of the upper channel portion extending from one side flange to the other of the lower channel portion and joined thereto to form with the latter a box-like section.

13. In a vehicle body, a foldable top comprising articulated members adapted to be folded together as a unit and including a side rail formed from superimposed upwardly opening channel portions, each comprising a bottom terminating in upwardly extending side flanges, the bottom of the upper channel portion extending from one side flange to the other of the lower channel portion and joined thereto to form with the latter a box-like section, the distance between the side flanges of the upper channel portion being greater than the width of said box-like section thereby forming a longitudinal recess, and sealing means for the upper edge of a window panel mounted in said recess.

14. In a vehicle body, a foldable top comprising articulated members adapted to be folded together as a unit and including a side rail formed from superimposed upwardly opening channel portions, each comprising a bottom terminating in upwardly extending side flanges, the bottom of the upper channel portion closing the top of the lower channel portion to form therewith a closed box-like section, said bottom of the upper channel portion extending laterally from the adjacent side flange of the lower channel portion to form in the angle therebetween a recess, and sealing means for the upper edge of a window panel mounted in said recess.

15. In a foldable top for a vehicle body, a side rail comprising an upwardly opening channel portion and an underlying hollow closed box-like section rigidly joined thereto, the latter including spaced side flanges spanned at their upper edges by the bottom of said channel portion.

16. In a foldable top for a vehicle body, a side rail comprising an upwardly opening channel portion and an underlying hollow closed box-like section rigidly joined thereto, the latter including spaced side flanges spanned at their upper edges by the bottom of said channel portion, said bottom extending laterally from the adjacent side flange of the box-like section to form in the angle therebetween a recess to receive a sealing means for the upper edges of a window panel.

17. In a vehicle body, a foldable top including a side rail comprising nested members joined together and forming an upwardly opening channel portion and a closed box-like portion therebeneath of less width than the channel portion forming a longitudinal recess adapted to receive the upper edge of a window panel, the upper wall of said box-like portion being formed by the bottom wall of said channel portion.

18. In a vehicle body, a foldable top including a side rail comprising interfitting upper and lower channel members joined together and forming an upwardly opening channel portion and a closed box-like portion therebeneath, the upper wall of said box-like portion being formed by the bottom of said upper channel portion.

19. In a vehicle body, a foldable top including articulated links and a side rail, said rail comprising members secured together to form an upwardly opening channel portion and a closed box-like portion therebeneath, the upper wall of said box-like portion being formed by the bottom of said channel portion, and a bracket member mounted within said channel portion, one of said links being pivoted to said bracket member.

20. In a vehicle body, a foldable top including articulated links and a side rail, said rail comprising members secured together to form an upwardly opening channel portion and a closed box-like portion therebeneath, the upper wall of said box-like portion being formed by the bottom of said channel portion, and a bracket member mounted within said channel portion and having a portion substantially closing said channel portion at the end of the rail, one of said links being pivoted to said bracket member.

21. In a vehicle body, a foldable top having a side rail comprising an upwardly opening channel portion and a closed box-like portion therebeneath, the upper wall of said box-like portion being formed by the bottom of said channel portion, a bracket member housed within said channel portion at an end of the rail, and a top supporting bow having one end rigidly secured to said bracket member.

22. In a vehicle body, a foldable top having a side rail comprising an upwardly opening channel portion and a closed box-like portion therebeneath, the upper wall of said box-like portion being formed by the bottom of said channel portion, a cast metal bracket member rigidly mounted within said channel portion and having its end substantially closing the end of the channel portion and provided with a flat end face.

23. A foldable top for a vehicle body including a pair of side rails arranged end to end, each rail comprising an upwardly opening channel portion, bracket members secured within the adjacent ends of said channel portions and having extensions arranged in parallelism and laterally overlapping relation when the top is open, means for pivoting said extensions together intermediate the ends thereof, a top supporting bow secured to the end of one of said extensions, and a link actuated arm secured to the end of the other extensions.

24. In a vehicle body, a foldable top comprising articulated members adapted to be folded together as a unit and including a side rail formed from superimposed upwardly opening integral channel portions, each comprising a bottom terminating in upwardly extending side flanges, the bottom of the upper channel portion extending from one side flange to the other of the lower channel portion and integrally joined thereto to form with the latter a box-like section, the distance between the side flanges of the upper channel portion being greater than the width of said box-like section thereby forming a longitudinal recess, and sealing means for the upper edge of a window panel mounted in said recess.

25. In a foldable top for a vehicle body, a one piece metal side rail comprising an upwardly opening channel portion and an underlying hollow closed box-like section rigidly joined thereto, the latter including spaced side flanges spanned at their upper edges by the bottom of said channel portion.

26. In a vehicle body, a foldable top including articulated links and a side rail, said side rail comprising a one piece metal member formed with an upwardly opening channel portion and a closed box-like portion therebeneath, the upper wall of said box-like portion being formed by the bottom of said channel portion, and a bracket member mounted within said channel portion and secured to said upper wall, one of said links being pivoted to said bracket member.

27. In a foldable top, a pair of side rails arranged end to end and hinged together, each rail being formed integrally as a single metal section comprising an upwardly opening channel having the lower portion of one upright side wall offset inwardly to provide a longitudinal recess to receive the upper edge of a window panel, the top generally horizontal wall of said recess extending inwardly and joining the inner upright side wall of the channel to form a closed box-like section.

28. In a foldable top, a pair of side rails arranged end to end and hinged together, each rail being formed integrally as a single metal section comprising an upwardly opening channel having the lower portion of one upright side wall offset inwardly to provide a longitudinal recess to receive the upper edge of a window panel, the top generally horizontal wall of said recess extending inwardly and joining the inner upright side wall of the channel to form a closed box-like section, said side rails having extensions arranged in laterally overlapping relation when the top is open and pivoted together, one of said extensions having a longitudinal recess forming a continuation of said first named recess.

29. In a foldable top for a vehicle body, a one piece metal side rail comprising an upwardly opening channel portion and an underlying hollow closed box-like section rigidly joined thereto, the latter including spaced side flanges spanned at their upper edges by the bottom of said channel portion, the outer of said side flanges being offset inwardly of the outer side of said channel portion to form with the bottom of the latter a longitudinal recess adapted to receive a window sealing strip.

30. In a folding top construction for motor vehicles, a header, a plurality of bows, and a pivotally connected top linkage connected with said header and bows and providing the top framework, said top linkage including a side rail extending along each longitudinal edge portion of the top and connected at its forwardly extending end to said header and pivotally connected at its rearwardly extending end with a pillar pivotally mounted adjacent the rearward portion of the side of the motor vehicle body, said side rails and pillars each comprising an open top box channel adapted to conceal the longitudinal structural members of the top, having an internal reinforcing cross member secured to the sides and spaced from the top thereof, and a channel portion integrally formed along one longitudinal edge of said box channel and adapted to hold a resilient weather-sealing member for contact with the rigid edge portions of windows mounted in the motor vehicle body, and means for connecting portions of the said top linkage to said reinforcing cross members internally of said side rails and pillars.

31. In a folding top construction for a vehicle body, a longitudinally extending folding header on each side of the top, and having its forward end connected with a cross header and its rearward end pivotally connected with the vehicle body, said folding header comprising an open top box channel member extending along the longitudinal side edges of the top and having side portions extending upwardly to conceal the longitudinal structural members of the top, and an internal reinforcing cross member secured to the sides of said box channel member and spaced from the top thereof, portions of said cross member being connected to the longitudinal structural members of the top.

32. In a folding top construction for a vehicle body, a longitudinally extending folding header on each side of the top and having its forward end connected with a cross header and its rearward end pivotally connected with the vehicle body, each of said folding headers including an open U-shaped channel portion extending along one longitudinal side edge of the top, the arms of said U extending upwardly to conceal the longitudinal structural members of the top, a plurality of pivotally mounted links and levers forming the structural framework of the top and connected with said longitudinally extending folding headers within the open channel portion thereof, said links and levers including a power link pivotally mounted at one end to the vehicle body and connected at its other end with the said longitudinal header and the top operating linkage, and a reinforcing member secured to the sides of said open U-shaped channel portion of said longitudinal header members and extending throughout the length thereof and means for connecting said reinforcing member and the operating mechanism of said folding top.

CLIFFORD B. DOTY.

REFERENCES CITED

The following references are of record in the file of this patent:

UNITED STATES PATENTS

| Number | Name | Date |
|---|---|---|
| 797,692 | Kirchner | Aug. 22, 1905 |
| 1,772,779 | Maise | Aug. 12, 1930 |
| 1,891,740 | Westerman | Dec. 20, 1932 |
| 2,165,594 | Waterhouse | July 11, 1939 |
| 2,213,222 | Keller | Sept. 3, 1940 |
| 2,272,299 | Ingildsen et al. | Feb. 10, 1942 |
| 2,278,646 | Clark | Apr. 7, 1942 |
| 2,288,013 | Moynahan et al. | June 30, 1942 |
| 2,329,802 | Westrope | Sept. 21, 1943 |